(12) United States Patent
Elliott et al.

(10) Patent No.: US 8,387,842 B2
(45) Date of Patent: Mar. 5, 2013

(54) CAR TOP CARRIER

(75) Inventors: John Mark Elliott, Beaverton, OR (US);
Chris Sautter, Portland, OR (US)

(73) Assignee: Yakima Products, Inc., Beaverton, OR (US)

(*) Notice: Subject to any disclaimer, the term of this patent is extended or adjusted under 35 U.S.C. 154(b) by 750 days.

(21) Appl. No.: 12/494,218

(22) Filed: Jun. 29, 2009

(65) Prior Publication Data

US 2010/0084447 A1    Apr. 8, 2010

Related U.S. Application Data

(60) Provisional application No. 61/133,442, filed on Jun. 27, 2008.

(51) Int. Cl.
*B60R 9/00* (2006.01)
(52) U.S. Cl. .................. 224/328; 224/319; 224/325
(58) Field of Classification Search .................. 224/585, 224/309, 315, 325, 329, 282, 316, 317, 320, 224/321, 326, 328, 553; 410/2, 52; 248/503; 414/462; 220/332, 324, 252, 315, 318, 323, 220/810, 848; 16/231, 232
See application file for complete search history.

(56) References Cited

U.S. PATENT DOCUMENTS

| 5,799,848 | A | * | 9/1998 | Wills | 224/328 |
| 5,823,411 | A | * | 10/1998 | Gronwoldt et al. | 224/328 |
| 6,918,521 | B2 | * | 7/2005 | Settelmayer et al. | 224/319 |
| 6,948,645 | B2 | | 9/2005 | Pierce | |
| 7,258,260 | B2 | * | 8/2007 | Hurd | 224/319 |
| 7,740,157 | B2 | * | 6/2010 | Fisher et al. | 224/328 |
| 2005/0036847 | A1 | | 2/2005 | Brackmann | |
| 2006/0032878 | A1 | * | 2/2006 | Settelmayer et al. | 224/319 |
| 2006/0043130 | A1 | * | 3/2006 | Dabrowski | 224/328 |
| 2007/0205240 | A1 | * | 9/2007 | Castro et al. | 224/328 |
| 2007/0257075 | A1 | | 11/2007 | Fisher | |
| 2010/0084447 | A1 | * | 4/2010 | Elliott et al. | 224/319 |
| 2011/0174855 | A1 | * | 7/2011 | Carothers et al. | 224/328 |
| 2011/0186608 | A1 | * | 8/2011 | Sautter et al. | 224/328 |

OTHER PUBLICATIONS

Patent Cooperation Treaty "International Preliminary Report on Patentability" Application No. PCT/US2009/049128 dated Jan. 13, 2011, 7 pages.
The International Bureau of WIPO, International Search Report regarding PCT Application PCT/US2009049128, dated Sep. 22, 2009, 2 pages.

* cited by examiner

*Primary Examiner* — Nathan J Newhouse
*Assistant Examiner* — Corey Skurdal
(74) *Attorney, Agent, or Firm* — Kolisch Hartwell, P.C.

(57) ABSTRACT

A car top carrier incorporating improved dual-functioning hinge/latch mechanisms connected by a drive bar that translates pivotal rotation to open and close the carrier.

20 Claims, 6 Drawing Sheets

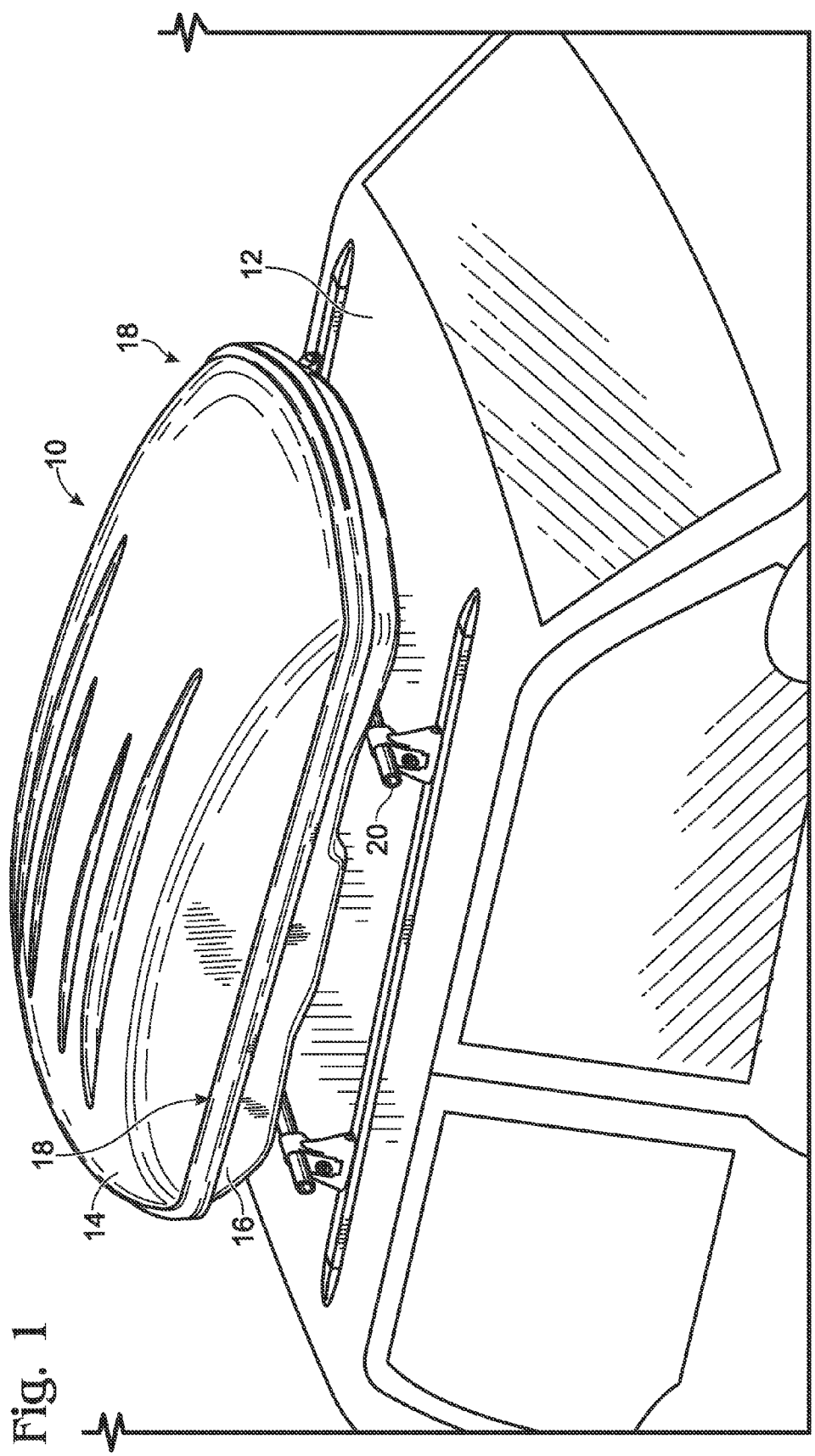

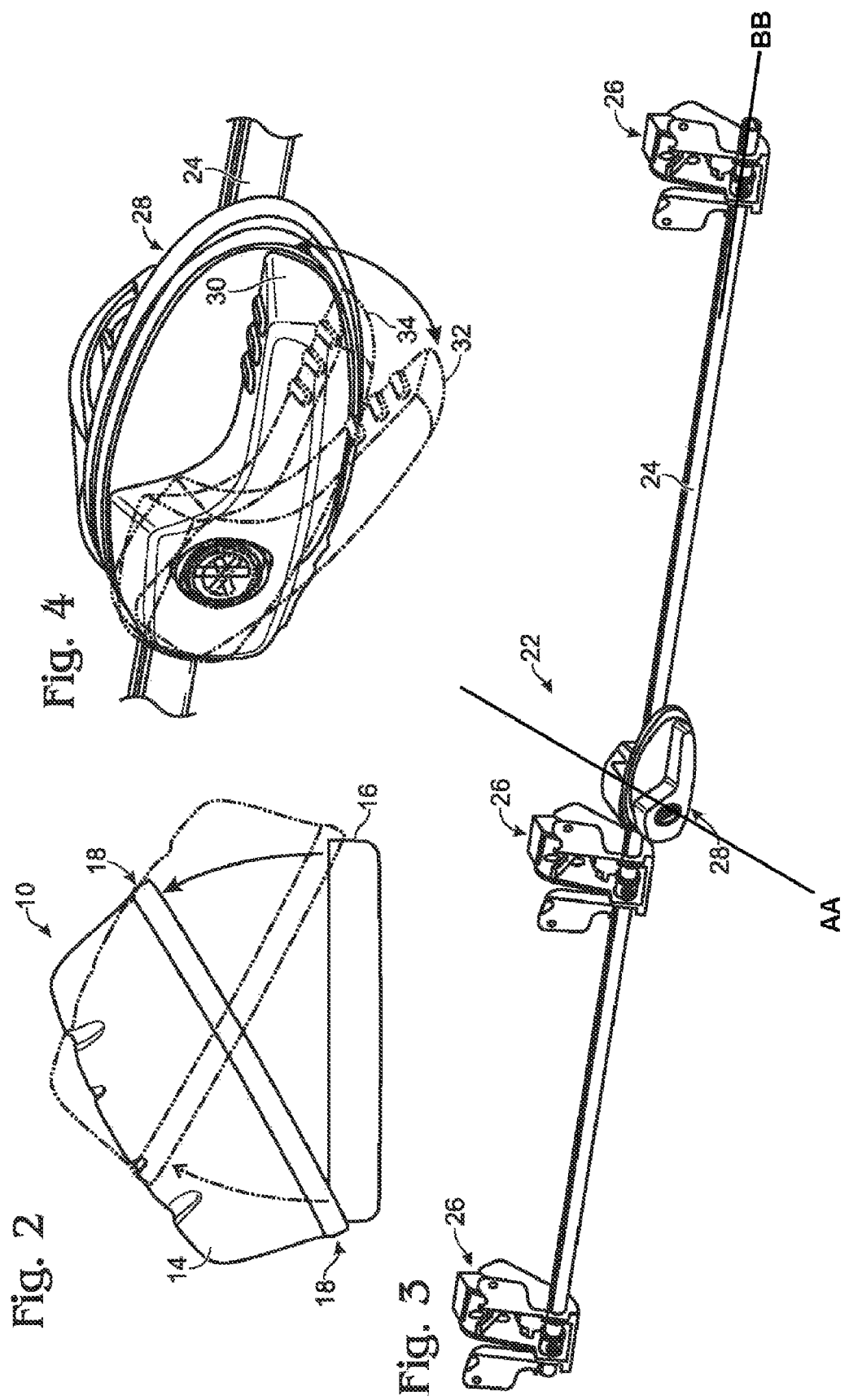

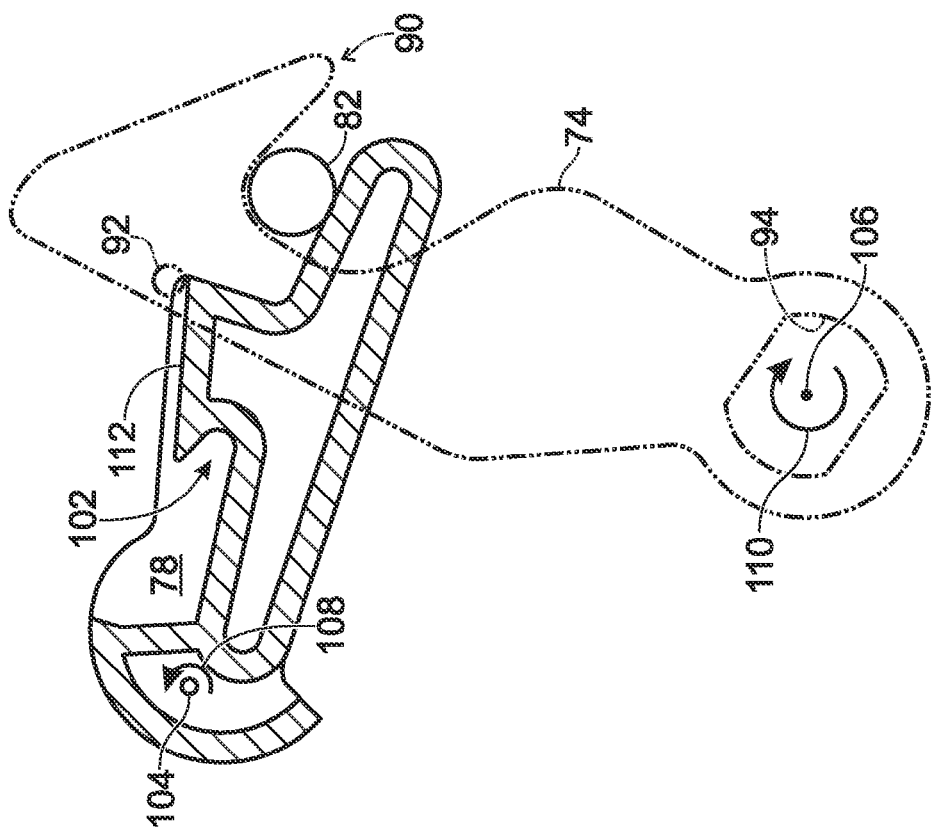
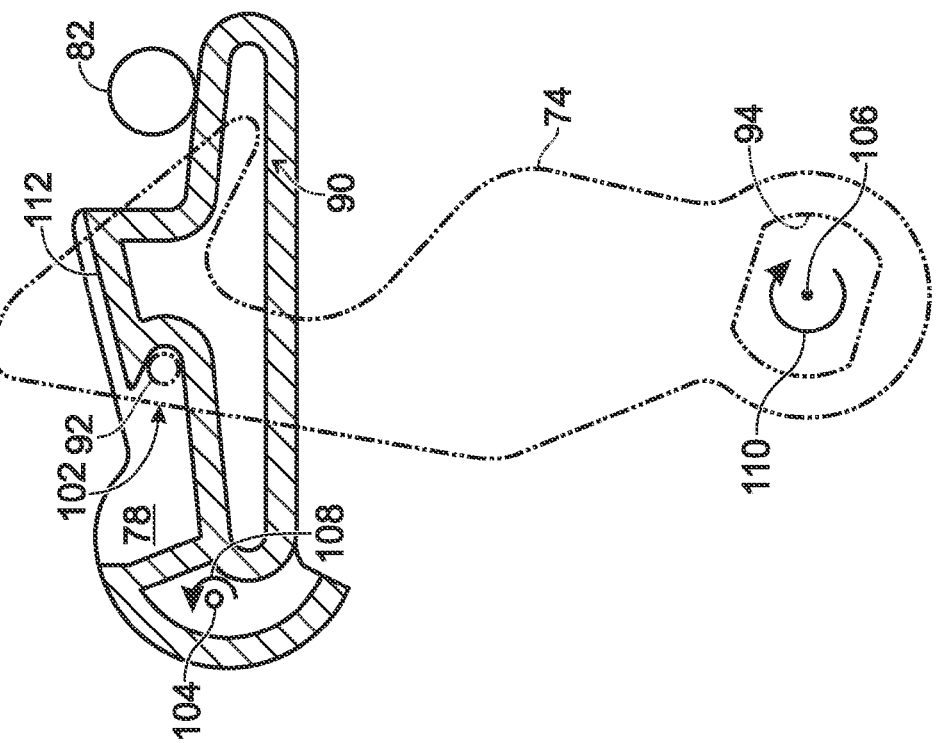

CAR TOP CARRIER

CROSS-REFERENCE TO RELATED APPLICATION(S)

This application claims priority under 35 U.S.C. §119(e) to U.S. Provisional Patent Application Ser. No. 61/133,442 filed on Jun. 27, 2008, and entitled "Box Latch System." The complete disclosure of the above-identified patent application is hereby incorporated by reference for all purposes.

FIELD OF THE DISCLOSURE

This disclosure relates to car top carriers. More specifically, this disclosure relates to car top carriers having one or more latches and a handle including a lock that interact together to secure cargo for transport in a car top carrier.

BACKGROUND

There are many types of dual-functioning hinge/latch mechanisms used in car top carriers. However, hinge/latch mechanisms often fail to account for variations in temperatures that cause components of the hinge/latch system to expand and contract. Because this problem is not taken into account, car top carriers having multiple latches are often difficult to open and close, particularly in extreme weather conditions. Additionally, some hinge/latch systems allow a user to think the carrier is locked when one or more of the latches are not properly engaged. An improperly latched lid may lead to theft of items stored in the carrier, and may permit the lid to pop open when the vehicle reaches higher speeds.

Examples of car top carriers including box latches are found in the following patents and published applications: U.S. Pat. Nos. 1,313,687; 3,008,177; 3,677,196; 4,217,999; 4,249,684; 4,274,568; 4,406,387; 5,419,479; 5,492,258; 5,546,705; 5,582,313; 5,762,244; 5,823,411; 5,845,828; 5,947,356; 6,145,719; 6,276,311; 6,296,161; 6,296,278; 6,463,627; 2002/0030074; DE2804588; DE19526477; WO04067326; US-2006-0032878-A1 and US-2007-0257075-A1. The patents and publications listed above are incorporated herein by reference in their entirety for all purposes.

SUMMARY

A car top carrier having an improved dual-functioning hinge/latch mechanism is provided. A pair of hinge/latch systems are mounted in the interior of a car top carrier along opposing sides. Each hinge/latch system has a plurality of coordinated hinge/latch mechanisms connected to a handle by a drive bar. The handle is accessible from the exterior of the carrier. When a user rotates the handle, the drive bar rotates causing the hinge/latch mechanism release the lid for opening.

BRIEF DESCRIPTION OF THE DRAWINGS

FIG. 1 shows a perspective view of a car top carrier attached to the top of a vehicle.

FIG. 2 shows an end view of a car top carrier opened alternately from opposing sides.

FIG. 3 shows a perspective view of a latch system for use in a car top carrier.

FIG. 4 shows a perspective view of a handle assembly, wherein the handle alternately indicates that the car top carrier is latched, un-latched, and not fully latched.

FIG. 9 shows a side view of an isolated trigger and latch clasp in the un-latched position.

FIG. 10 shows a side view of a trigger and latch clasp for use in a latch system in the latched position

DETAILED DESCRIPTION

Figure 5:
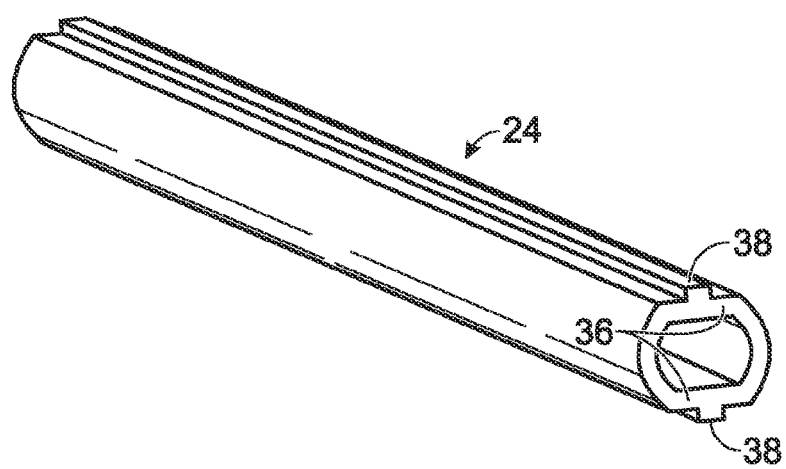
FIG. 5 shows a perspective view of a drive bar for use in a latch system.

This disclosure provides numerous selected examples of invented devices for carrying cargo on or with a vehicle. Many alternatives and modifications which may or may not be expressly mentioned are enabled, implied, currently possessed, and supported by the disclosure.

FIG. 1 shows car top carrier 10 mounted on vehicle 12. Carrier 10 includes top portion 14 and bottom portion 16 and opposing lateral sides 18. Clamp devices (not shown) are used to attach bottom portion 16 of carrier 10 to crossbars 20 mounted to the top of vehicle 12.

FIG. 2 shows an end view of carrier 10 opened alternately from opposing sides 18. Carrier 10 may be opened by a user from a first side and pivot about the opposing side. This feature of carrier 10 is made possible by dual-functioning hinge/latch mechanisms such as the examples described in detail below.

FIG. 3 illustrates latch system 22 for use in carrier 10. Latch system 22 includes a drive bar 24 that connects one or more latch assemblies 26 and a handle assembly 28. Latch system 22 is configured to be attached to the inside portion of carrier 10 along one of sides 18 via screws, rivets, or other appropriate fasteners. As described below, portions of handle assembly 28 may be accessible from the exterior of carrier 10 so as to be accessible to a user. Latch system 22 provides a system by which top portion 14 and bottom portion 16 of carrier 10 may be securely engaged for transit and opened by a user to retrieve contents from carrier 10.

As shown in FIGS. 3 and 4, and described in more detail below, rotation of handle 28 around axis AA imparts rotational movement of bar 24 around axis BB. Axis AA is substantially perpendicular to axis BB.

FIG. 4 shows a detailed view of handle assembly 28 from latch system 22 of FIG. 3. Handle assembly 28 is shown rotating between three positions—closed 30, open (or "released") 32, and intermediate (or "partially released") 34 positions. Each of the three positions may indicate a different status of latch system 22. Handle assembly 28 may also function as an indicating device. For example, closed position 30 may indicate latch system 22 is in the fully latched position, meaning carrier 10 is closed and latched; open position 32 may designate that carrier 10 is open and unlatched; and intermediate position 34 may indicate that one or more latch assemblies 26 are latched, but the carrier is not completely engaged or locked.

FIG. 5 shows drive bar 24 illustrated in FIGS. 3 and 4. Drive bar 24 may provide a rotational connection between one or more latch assemblies 26 and handle assembly 28. Drive bar 24, as shown, may be an elongate tube formed of metal or other rigid material. As shown in FIG. 5, drive bar 24 may include opposing flat portions 36 and tabs (ridges, or spines) 38 formed in the tube. Such a structure may permit latch assemblies 26 and handle assembly 28 to slide or adjust along drive bar 24 due to expansion and contraction due to fluctuations in temperature, while reliably and effectively translating pivotal rotation between latch assembly 26 and handle assembly 28.

Figure 6:
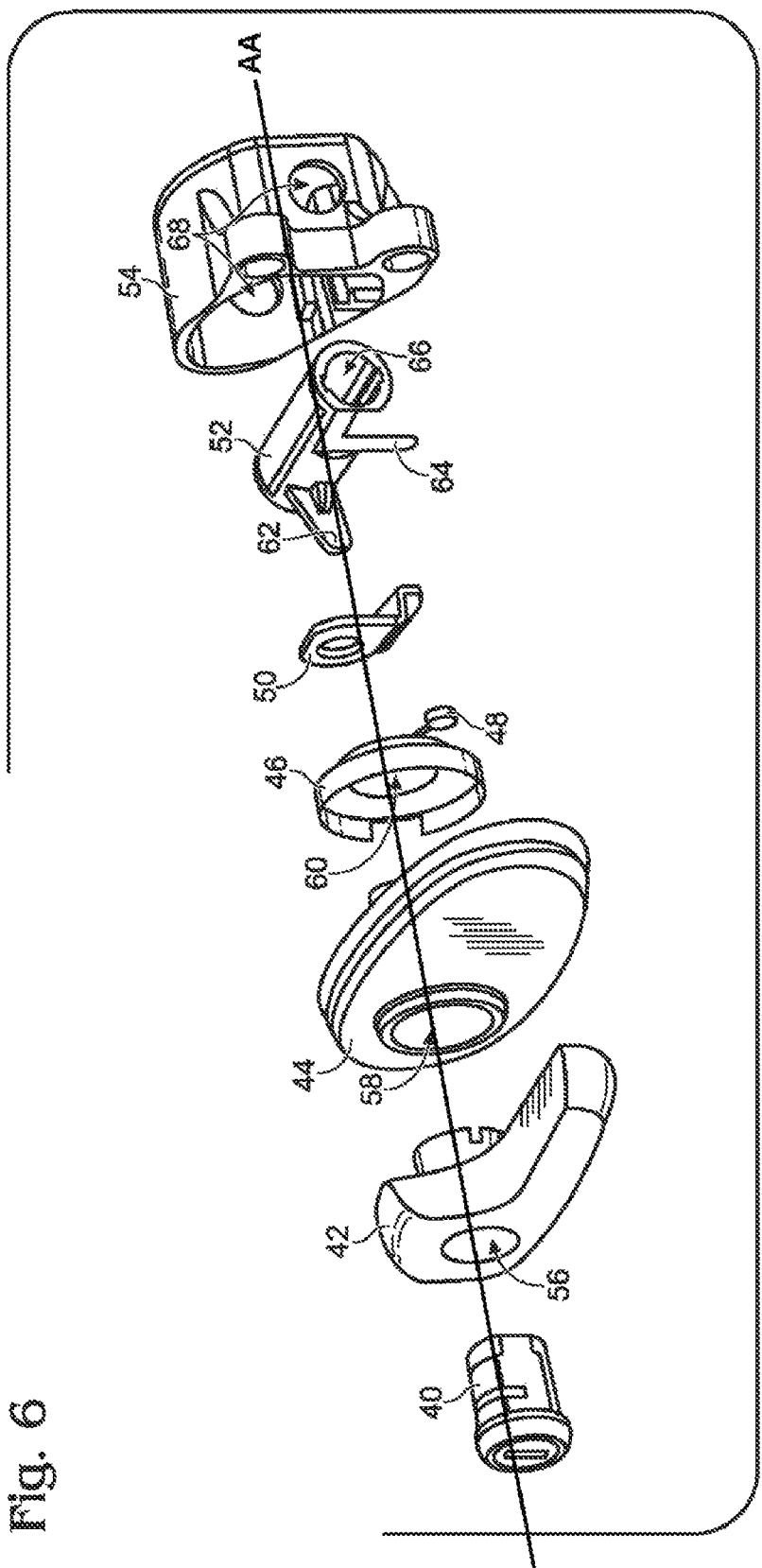
FIG. 6 shows an exploded view of a handle assembly for use in a latch system.

FIG. 6 shows an exploded view of handle assembly 28. Each component of handle assembly 28 is shown in the latched position, meaning carrier 10 is closed. Handle assembly 28 includes lock 40, handle 42, handle base 44, handle driver 46, handle spring 48, lock cam 50, bar driver 52, and lock cover or housing 54. The components of handle assembly 28 function to impart rotational movement on drive bar 24 when handle 42 is manipulated, specifically rotated. The components, their function, and interaction with one another are discussed in detail below.

Lock 40 of FIG. 6 may lock and unlock carrier 10 using a key. When lock 40 is in the locked position, handle assembly 28 is prohibited from rotating and carrier 10 cannot be opened using handle assembly 28. However, when lock 40 is in the unlocked position, handle assembly 28 operates in the manner described in detail below. In some embodiments, the key may not be removed from lock 40 unless handle assembly 28 is in closed position 30. This feature prevents a user from unknowingly leaving carrier 10 open.

As shown in FIG. 6, lock 40 is disposed in a cavity or channel 56 formed in handle 42. Users may rotate handle 42 to unlatch and open carrier 10. Handle 42 interacts with other components of handle assembly 28 to impart rotational movement of drive bar 24. The rotational movement imparted on drive bar 24 is thereafter translated to latch assembly 26 which causes carrier 10 to open or close. The manner in which handle assembly 28 rotates drive bar 24 will be appreciated with consideration of the description below. Handle 42 also may indicate whether carrier 10 is fully latched or un-latched. As noted above, the location of handle 42—open position 30, closed position 32, or intermediate position 34—indicates the current status of carrier 10.

When handle assembly 28 is fully assembled, lock 40 and handle 42 extend through an aperture 58 defined in handle base 44. Handle base 44 is connected to the exterior of carrier 10 making handle 42 and lock 40 accessible from the exterior of carrier 10. Aperture 58 may align with an opening in carrier 10 (not shown) such that lock 40 and handle 42 may extend into the interior of carrier 10 to interact with components of handle assembly 28 disposed therein.

Handle driver 46 connects to handle 42 via aperture 58 defined in handle base 44 and carrier 10. Handle 42 is fixedly attached to handle driver 46 such that handle driver 46 translates rotation of handle 42 to components disposed within carrier 10. For example, when a user rotates handle 42, handle driver 46 rotates correspondingly.

Handle spring 48 is connected to handle driver 46. Handle spring 48 is oriented so as to bias handle driver 46 toward the open or un-latched position. The biasing force imparted by handle spring 48 may be translated to handle 42 via the connection between handle driver 46 and handle 42.

Lock cam 50 is connected to lock 40 through channel 56 in handle 42 and apertures 58 and 60 defined in handle base 44 and handle driver 46, respectively. Lock cam 50 prevents handle 42 from rotating when lock 40 is in the locked position, thus preventing a user from opening carrier 10 using handle assembly 28. However, when lock 40 is in the unlocked position, lock cam 50 rotates when handle 42 is rotated by a user. Additionally, when handle 42 is in the un-latched position, lock cam 50 may not fully rotate back to the locked position, thereby preventing handle 42 from returning to the locked position.

Bar driver 52 includes lateral tab 62, down tab 64, and channel 66 through which drive bar 24 may extend. Bar driver 52 is configured to impart pivotal rotation on drive bar 24 when handle 42 is turned by a user. As will be appreciated with the description below, the rotation imparted on drive bar 24 is then translated to latch assembly 26 to open carrier 10. Bar driver 52 is rotated by contact from lock cam 50 on lateral tab 62 when handle 42 is rotated by a user. The rotation forced by lock cam 50 causes lateral tab 62 and down tab 64 to rotate upward. Down tab 64 is positioned such that lock cam 50 cannot rotate back to the latched position until bar driver 52 is rotated back to the latched position. Bar driver 52 is rotated back to the latched position when latch assembly 26—described below with reference to FIGS. 7 and 8—is closed by a user.

Lock cover or housing 54 houses each of the components of handle assembly 28 disposed inside carrier 10. Lock cover 54 may be fastened to the interior or bottom portion 16 of carrier 10. Opposing apertures 68 are formed in lock cover 54 to provide bearing surfaces for drive bar 24. Apertures 68 may align with channel 66 in bar driver 52 when handle assembly 28 is fully assembled.

Figure 7:
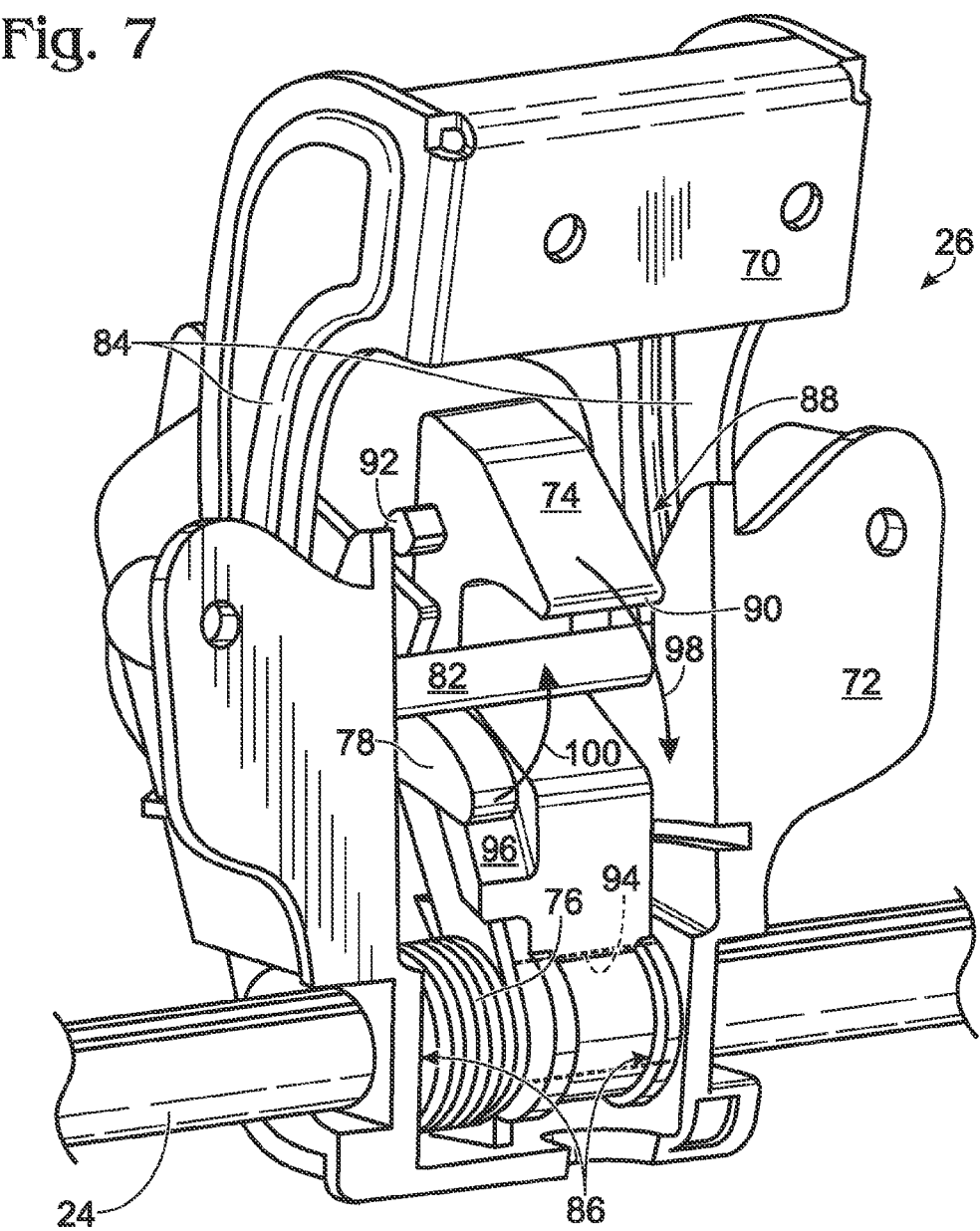
FIG. 7 shows a perspective view of an isolated latch in the latched position for use in a latch assembly.

FIG. 7 shows latch assembly 26 in detail. Multiple latch assemblies 26 may be incorporated into latch system 22 and may be integrated on each opposing side 18 of carrier 10. Latch assembly 26 is a dual-function latch and hinge which permits top portion 14 and bottom portion 16 to attach and rotate relative to one another. Latch assembly 26 includes latch catch 70, latch housing 72, latch clasp 74, clasp spring 76, trigger 78, and trigger spring (not shown). As illustrated in FIG. 7, latch assembly 26 is shown in the latched or closed position.

Latch catch 70, as shown in FIG. 7, may be fastened to the inside of top portion 14 of carrier 10. Latch catch 70 includes a latch catch pin 82 that extends between opposing brackets 84. Latch catch pin 82 provides a structure by which latch clasp 74—described below—may engage to latch top portion 14 and bottom portion 16. Additionally, latch catch pin 82 is formed so as to permit pivotal rotation between top portion 14 and bottom portion 16 when engaged.

Latch housing 72 may provide a protective housing for the other components of latch assembly 26 and may be fastened to the inside of bottom portion 16 of carrier 10. The interior of latch housing 72 may provide bearing surfaces for drive bar 24 and trigger 78. As shown in FIG. 7, drive bar 24 may extend though opposing apertures 86 defined in latch housing 72, thus connecting latch assembly 26 to handle assembly 28. Latch housing 72 also includes opposing guides 88—shown in greater detail in FIG. 8—to guide latch catch pin 82 into latch housing 72 when a user is closing carrier 10.

Latch clasp 74 is housed within latch housing 72 and includes hook portion 90 and pin knob 92. As shown in FIG. 7, when latch assembly 26 is in the latched position, hook portion 90 engages latch catch pin 82. Hook portion 90 prevents latch catch pin 82 from disengaging, which would cause carrier 10 to open. Pin knob 92 interacts with trigger 78—as described in detail below—to prevent latch clasp 74 from moving forward to prematurely engage latch catch pin 82.

Latch clasp 74 also includes a channel 94 that aligns with apertures 86 defined in latch housing 72. Drive bar 24 may extend through apertures 86 and channel 94. Channel 94 may be formed such that latch clasp 74 may slide along drive bar 24 while not rotating about it. This connection to drive bar 24 provides the pivotal rotation connection with handle assembly 28. When latch assembly 26 is in the latched position—as shown in FIG. 7—drive bar 24 causes bar driver 52 and other components of handle assembly 28 to rotate to the latched position. Conversely, when a user rotates handle 42 to open carrier 10, bar driver 52 rotates drive bar 24 and consequently latch clasp 74 to the open position—shown in FIG. 8—releasing latch catch pin 82.

Clasp spring 76 is disposed about drive bar 24. Clasp spring 76 contacts the interior wall of latch housing 72 at one end and a tab 96 formed on latch clasp 74 at the other end. The orientation of clasp spring 76 biases latch clasp forward in the direction shown by directional arrow 98.

As noted above, trigger 78 interacts with pin knob 92 to prevent latch clasp from moving forward until latch catch pin 82 is sufficiently forced into latch assembly 26. Trigger 78 is rotationally attached to the interior wall of latch housing 72. When latch catch pin 82 is forced into latch housing 72 by a user closing carrier 10, latch catch pin 82 first contacts the distal end of trigger 78. As latch catch pin 82 is forced downward, trigger 78 also pivots downward. When latch catch pin 82 is forced downward to the point at which it clears hook portion 90 of latch clasp 74, pin knob 92 is released and the bias provided by clasp spring 76 causes latch clasp 74 to rotate forward to capture latch catch pin 82.

A trigger spring, which is not shown, biases trigger 78 upward in the direction shown by directional arrow 100. The biasing provided by the trigger spring causes latch catch 70 and consequently top portion 14 of carrier 10 to "pop" open when opened. The trigger spring also provides the force that holds pin knob 92 in place until trigger 78 has been sufficiently rotated.

Figure 8:
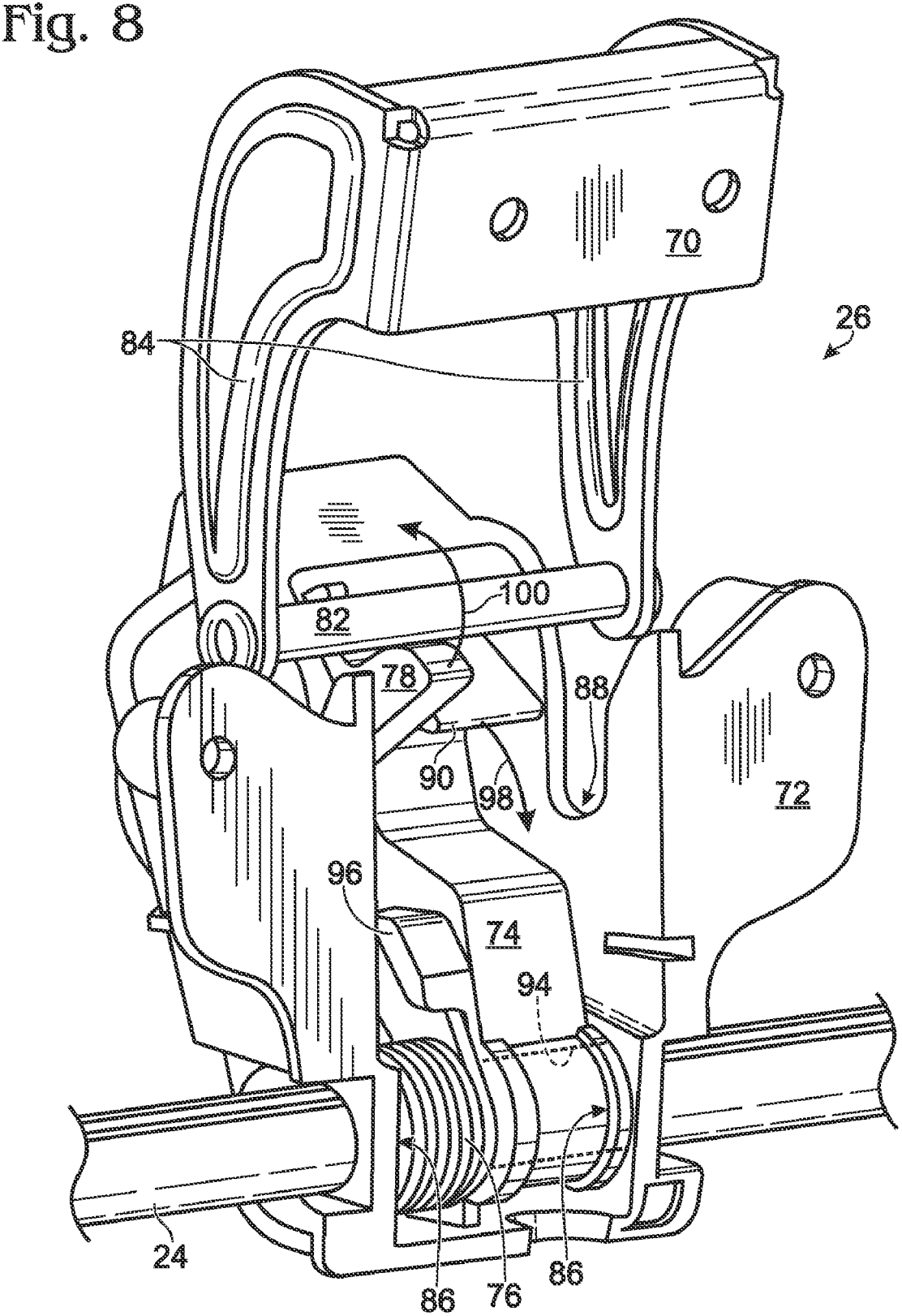
FIG. 8 shows a perspective view of the latch of FIG. 7 for use in a latch assembly.

FIG. 8 shows latch assembly 26 of FIG. 7 in the un-latched or open position. As seen in FIG. 8, latch clasp 74 has disengaged latch catch pin 82 permitting it to be lifted from latch assembly 26. Latch catch pin 82 is shown resting on the upper side of trigger 78 which is forcing latch catch pin 82 upward due to the biasing provided by the trigger spring. Latch clasp 74 is held in the back or disengaged position by a hook 102 (FIGS. 9 and 10) formed in trigger 78 that engages pin knob 92 on latch clasp 74.

It should be appreciated that in latch system 22 incorporating multiple latch assemblies 26, carrier 10 will not close unless each latch assembly 26 is fully latched. Specifically, handle 42 will not rotate to closed position 30 until drive bar 24 rotates back to the closed position. Because drive bar 24 is connected to each latch assembly (three per side, for example) 26 incorporated in latch system 22, drive bar 24 will not rotate until each latch clasp 76 has either (1) engaged latch catch pin 82 to close carrier 10, or (2) released latch catch pin 82 to open carrier 10.

FIGS. 9 and 10 show a cross-sectional side view of the interaction between latch clasp 74 and trigger 78. FIG. 9 illustrates latch assembly 26 in the un-latched or disengaged position. FIG. 10 shows latch assembly 26 in the latched or fully engaged position. FIGS. 9 and 10 also show trigger pivot axis 104 and latch catch pivot axis 106 along with directional arrows 108 and 110 indicating the direction in which trigger 78 and latch clasp 74 are biased. The cross-hatched portion of trigger 78 indicates raised contours formed in the side of trigger 78. Specifically, the raised contours form hook 102 that interacts with pin knob 92 to hold back or release latch clasp 74 to engage latch catch pin 82.

FIG. 9 shows latch catch pin 82 initially contacting the upper surface of trigger 78. As latch catch pin 82 is forced downward, pin knob 92 moves upward relative to hook 102 on trigger 78. Hook 102 and pin knob 92 are formed such that pin knob 92 is fully released when latch catch pin 82 clears the distal end of hook portion 90 formed in latch clasp 74. As pin knob 92 is released from hook 102, latch clasp 74 moves forward to engage latch catch pin 82 because of the biasing provided by clasp spring 76. Pin knob 92 slides along a rail 112 formed in trigger 78 until latch clasp 74 eventually engages latch catch pin, as shown in FIG. 10.

While embodiments of a box latch system have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Many useful modified combinations of the devices disclosed may be implemented. Numerous elements of the disclosed devices may be interchanged or reversed. For example, the coordinating bar connecting latch/hinge devices may be carried on the lid instead of the bottom of a carrier. For a given latch/hinge device, the trigger and latch assembly may be mounted on the lid with a corresponding pin mounted on the bottom of a carrier. Any number of latch/hinge devices may be engaged on a single coordinating bar. Similar latch systems to those described and illustrated may be implemented on a carrier that only opens on one side.

We claim:

1. A cargo box comprising
a box having opposing lateral sides, a bottom portion and a lid portion pivotally connected to the bottom portion along each of the lateral sides, the box being equipped with clamp devices configured for clamping the box to a pair of crossbars on top of a vehicle, and
a hinge/latch system that permits opening of the lid portion on each of the lateral sides of the box, the hinge/latch system including a hinge/latch assembly on each lateral side of the box, each hinge/latch assembly having a plurality of hinge/latch devices mounted along one of the lateral sides of the box, a bar connecting the hinge/latch devices, and a handle located outside the box for controlling substantially synchronized release and engagement of the hinge/latch devices, wherein the handle is operatively connected to the bar via a driver assembly including a bar driver that surrounds the bar, the bar driver having a tab projecting perpendicular to a bar rotational axis, the tab being driven to rotate around the bar rotational axis in response to rotational movement of the handle around a handle rotational axis, the handle rotational axis being substantially perpendicular to the bar rotational axis.

2. The cargo box of claim 1, wherein each hinge/latch device may slide relative to the bar without significantly affecting the functional performance between the bar and the hinge/latch device.

3. The cargo box of claim 1, wherein each hinge/latch device has a pin member and a catch assembly for clasping the pin member when the hinge/latch device is engaged, one of the pin member and the catch assembly being mounted on the bottom portion, the other of the pin member and the catch assembly being mounted on the lid portion.

4. The cargo box of claim 3, wherein the pin member is mounted on the lid portion and the catch assembly is mounted on the bottom portion.

5. The cargo box of claim 3, wherein the catch assembly is mounted on the lid portion and the pin member is mounted on the bottom portion.

6. The cargo box of claim 3, wherein the bar for each hinge/latch assembly remains operatively connected with the catch assemblies of the hinge/latch devices.

7. The cargo box of claim 3, wherein each catch assembly has a hook-shaped latch and a trigger, downward movement of the pin member against the trigger beyond a set threshold causing forward movement of the latch to engage the pin member holding the hinge/latch device together.

8. The cargo box of claim 7, wherein the hinge/latch device functions as a hinge when the latch engages the pin member.

9. The cargo box of claim 8, wherein the relationship of the pin member and the latch permits sufficient tolerance for hinge movement of the lid portion relative to the bottom portion even with the corresponding pin members of one hinge/latch assembly having nonparallel axes due to the hinge/latch devices being mounted on a curved side of the box.

10. The cargo box of claim 1, wherein position of the handle provides visual indication of whether all of the hinge/latch devices in the respective hinge/latch assembly are fully engaged or not.

11. A car top carrier comprising:
  a carrier having a top portion, a bottom portion, and opposing lateral sides, the bottom portion being configured to attach to the top of a vehicle;
  one or more latch assemblies attached to each of the opposing sides of the carrier and releasably connecting the top portion to the bottom portion, each latch assembly having a first portion attached to the top portion of the carrier and a second portion attached to the bottom portion of the carrier, one of the first and second portions including a pin, the other portion including a clasp biased toward the closed position and configured to engage the pin, wherein the clasp pivotally rotates to engage the pin when the first portion is urged toward the second portion, the first and second portions providing pivotal rotation of the top portion relative to the bottom portion when the first and second portions are engaged;
  a drive bar located on each opposing side of the carrier and connected to the one or more latch assemblies, the drive bar being configured to pivotally rotate in a first direction when the clasp rotates to engage the pin and a second direction when the clasp disengages the pin; and
  a handle assembly connected to the drive bar and including a handle rotatable between an open position and a closed position, the handle assembly being configured to pivotally rotate the drive bar in the second direction when the handle is rotated to the open position and the handle is permitted to return to the closed position when the drive bar is rotated in the second direction by latch assembly,
  wherein the handle is operatively connected to the bar via a driver assembly including a bar driver that surrounds the bar, the bar driver having a tab projecting perpendicular to a bar rotational axis, the tab being driven to rotate around the bar rotational axis in response to rotational movement of the handle around a handle rotational axis, the handle rotational axis being substantially perpendicular to the bar rotational axis.

12. The car top carrier of claim 11 further comprising a lock integrated into the handle assembly, wherein the lock prevents rotation of the handle when locked and permits rotation of the handle when unlocked.

13. The car top carrier of claim 11, wherein the pin is disposed between a pair of brackets.

14. The car top carrier of claim 11, wherein the clasp includes a hook portion for engaging the pin.

15. The car top carrier of claim 14, wherein the clasp pivotally rotates to engage the pin when the pin clears the hook portion of the clasp.

16. A dual-functioning latch and hinge system for use in a car top carrier including top and bottom portions and opposing sides, the system being configured to releasably secure the top and bottom portions to one another and permit the top and bottom portions to pivotally rotate relative to one another, the system comprising:
  one or more latch assemblies attached to each side of the carrier, the latch assemblies including:
    a latch catch including a pin attached to one of the top and bottom portions of the carrier;
    a latch clasp attached to the other of the top and bottom portions and being configured to engage the latch catch;
    a trigger attached to the same portion of carrier as latch clasp and configured to hold the latch clasp in the open position while the carrier is open;
    wherein when the top and bottom portions are urged together, the latch catch pin contacts the trigger and forces the trigger toward the closed position until the latch clasp is released to engage the latch catch, the latch catch and latch clasp being configured to function as a hinge when engaged to the latch catch pin;
  a handle assembly being attached to each side of the carrier and configured to rotate between a closed position and an open position; and
  a drive bar attached to the handle assembly and latch assemblies on each side of the carrier, wherein the drive bar pivotally rotates in a first direction when the latch clasp rotates to engage the latch catch and a second direction when the clasp disengages the latch catch, and further wherein the drive bar pivotally rotates in the second direction causing the latch clasp to disengage the latch catch when the handle assembly is rotated from the closed position to the open position,
  wherein the handle is operatively connected to the bar via a driver assembly including a bar driver that surrounds the bar, the bar driver having a tab projecting perpendicular to a bar rotational axis, the tab being driven to rotate around the bar rotational axis in response to rotational movement of the handle around a handle rotational axis, the handle rotational axis being substantially perpendicular to the bar rotational axis.

17. The car top carrier of claim 16 further comprising a lock integrated into the handle assembly, wherein the lock prevents rotation of the handle when locked and permits rotation of the handle when unlocked.

18. The car top carrier of claim 16, wherein the latch catch pin is disposed between a pair of brackets.

19. The car top carrier of claim 16, wherein the latch clasp includes a hook portion for engaging the pin.

20. The car top carrier of claim 19, wherein the clasp pivotally rotates to engage the pin when the pin clears the hook portion of the clasp.

* * * * *